United States Patent
Lecourtier

(10) Patent No.: US 8,970,064 B2
(45) Date of Patent: Mar. 3, 2015

(54) DIRECT CURRENT UNINTERRUPTIBLE POWER SUPPLY DEVICE FOR A DATA-PROCESSING SYSTEM WITH AT LEAST ONE PROCESSOR

(75) Inventor: Georges Lecourtier, Vesailles (FR)

(73) Assignee: Bull SAS, Les Clayes-sous-Bois (FR)

( * ) Notice: Subject to any disclaimer, the term of this patent is extended or adjusted under 35 U.S.C. 154(b) by 786 days.

(21) Appl. No.: 13/131,000

(22) PCT Filed: Nov. 23, 2009

(86) PCT No.: PCT/FR2009/052268
§ 371 (c)(1),
(2), (4) Date: May 24, 2011

(87) PCT Pub. No.: WO2010/061116
PCT Pub. Date: Jun. 3, 2010

(65) Prior Publication Data
US 2011/0227416 A1    Sep. 22, 2011

(30) Foreign Application Priority Data
Nov. 25, 2008  (FR) ...................... 08 06601

(51) Int. Cl.
*H02J 7/00*   (2006.01)
*H02J 9/00*   (2006.01)
*H02J 9/06*   (2006.01)

(52) U.S. Cl.
CPC ..................................... *H02J 9/061* (2013.01)
USPC ........................................................ 307/66

(58) Field of Classification Search
CPC ............. H02J 9/00; H02J 9/062; H02J 9/061; H02J 9/06; H02J 7/00; H02J 7/37; H02J 9/04; H02J 1/10
USPC ................................ 307/64, 65, 66
See application file for complete search history.

(56) References Cited

U.S. PATENT DOCUMENTS

| 5,675,233 | A | 10/1997 | Kaneko et al. |
| 6,225,708 | B1 | 5/2001 | Furukawa et al. |
| 7,345,454 | B2 | 3/2008 | Thrap |
| 7,354,454 | B2 | 4/2008 | Thrap |
| 2005/0099750 | A1* | 5/2005 | Takahashi et al. .............. 361/92 |
| 2006/0186739 | A1 | 8/2006 | Grolnic et al. |
| 2007/0262651 | A1 | 11/2007 | Odaohara |

FOREIGN PATENT DOCUMENTS

| EP | 1 306 958 A2 | 2/2003 |
| EP | 1 639 684 | 3/2006 |

(Continued)

OTHER PUBLICATIONS

Sukumara et al., "Fuel Cell Based Uninterrupted Power Sources", Power Electronics and Drive Systems, 1997, pp. 728-733.

*Primary Examiner* — Carlos Amaya
(74) *Attorney, Agent, or Firm* — Miles & Stockbridge P.C.

(57) ABSTRACT

A direct current backup power supply device of a data processing system with at least one computer supplied with very low voltage whose direct current power supply is connected to an alternating current power supply system using an AC/DC converter of alternating current into direct current includes means for storing electrical energy. The device also includes means for charging the means for storing electrical energy from a part of the direct current provided by the AC/DC converter to the very low voltage power supply of the data processing system, and means for discharging the stored energy in the means for storing electrical energy to the very low voltage power supply of the data processing system, to a noticeably constant predetermined very low voltage, following the detection of a micro-cut of the supply system.

10 Claims, 3 Drawing Sheets

(56) References Cited

FOREIGN PATENT DOCUMENTS

| EP | 1 661 226 | 5/2006 |
| EP | 2 093 859 A1 | 8/2009 |
| WO | WO 2005/001961 A2 | 1/2005 |
| WO | WO 2005/006466 A2 | 1/2005 |

* cited by examiner

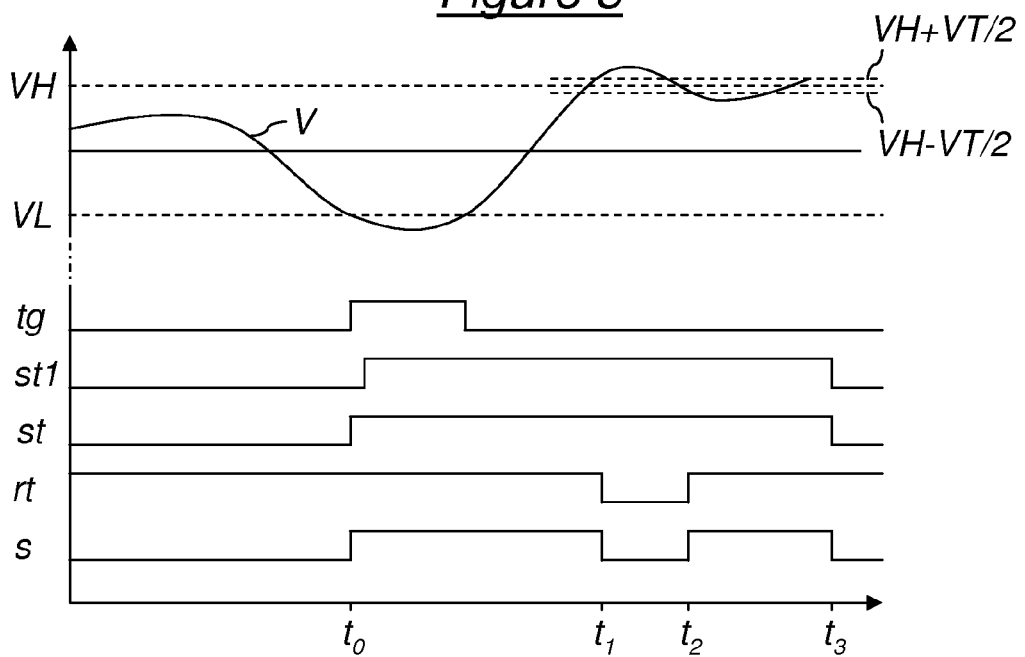
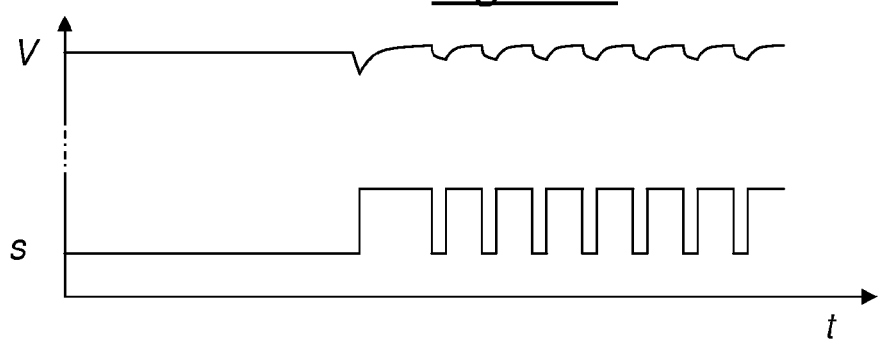
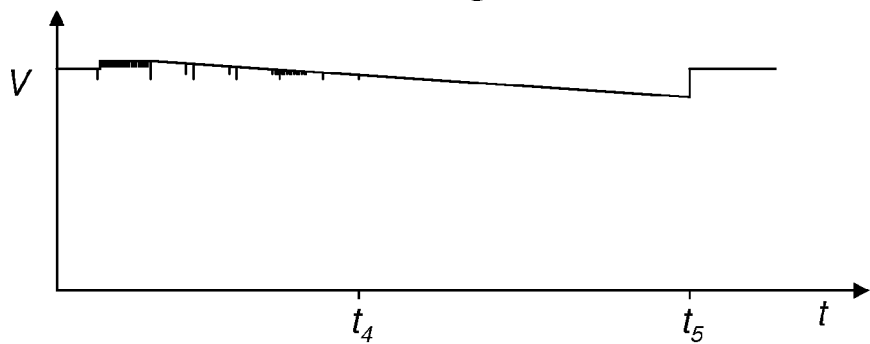

DIRECT CURRENT UNINTERRUPTIBLE POWER SUPPLY DEVICE FOR A DATA-PROCESSING SYSTEM WITH AT LEAST ONE PROCESSOR

BACKGROUND OF THE INVENTION

The present invention relates to a direct current backup power device of an electrical data processing system comprising at least one computer supplied with very low voltage. It also relates to an installation comprising such a device.

More precisely, it applies to a data processing system whose direct current power supply is intended to be connected to an alternating current supply system by means of an AC/DC converter of alternating current into very low voltage direct current.

"Very low voltage" is understood to mean a voltage generally qualified as "safety voltage" which enables an operator to handle any electrical component safely under this voltage. Such a voltage is furthermore generally adapted to the electronic components of a data processing system. Several domains are defined legally in France and in Europe (TBT, TBTS, TBTP, TBTF) but all place very low voltages under the threshold of 120 V direct current and under the threshold of 50 V alternating current.

The voltage of an alternating current distributed by an electrical power distribution system is generally in the order of 220/230 V, which therefore a priori represents a danger for an operator. However, it is generally considered that a voltage of 50 V or less does not represent a danger when handled. So, in telecommunication applications, the transmission data processing systems are generally subject to a voltage of about 48 V. In the field of aeronautics, the on-board components are generally subject to a direct voltage of about 24 V. Lastly, a data processing system of the computer type is generally subject to a direct voltage of about 12 V.

A data processing system is for example a set of computer servers interconnected in a local network thus forming a high performance computer generally qualified as a HPC (High Performance Computing) computer. In this case, as in other sensitive applications (computer server, fixed or portable microcomputer, telecommunication radio-frequency station, etc.), it is important that the operation of the electrical system is not disturbed by micro-cuts of the alternating current supply system. Indeed, such micro-cuts, even when they only last for a few hundred milliseconds or so, can bring about calculation errors, data losses or highly penalizing malfunctions of the HPC computer.

However, such micro-cuts are fairly frequent as the controller of the alternating current supply system can occasionally need to shed the load of parts of the system. They generally have a duration equivalent to a few periods of the alternating current: for an alternating current of 50 Hertz, a micro-cut of ten to twelve periods thus lasts between 200 and 250 milliseconds. Furthermore, the restarting of the AC/DC converter following a micro-cut can also take 100 to 200 milliseconds, which gives a micro-cut, viewed from the electrical system, that can last up to 450 milliseconds.

Installations comprising an electrical system for data processing, of the system micro-cut sensitive type, generally provide an uninterruptible power supply device which makes it possible to provide a stable power supply without micro-cuts, whatever happens on the alternating current supply system. This uninterruptible power supply is generally directly connected to the supply system and therefore comprises a rectifier for alternating current conversion into direct current. Furthermore, it is fitted with an energy storage device, such as a storage battery or a set of super-capacitors, and with an uninterruptible power supply to convert the direct current generated by the energy storage device into an alternating current. Inserted between the alternating current supply system and the AC/DC converter of the installation, it therefore substitutes for the supply system to provide electrical energy to the electrical system during micro-cuts. Such an uninterruptible power supply device is for example described in Sukumara et al's article called "Fuel cell based uninterrupted power sources", published in 1997 International Conference on Power Electronics and Drive Systems Proceedings, vol. 2, pages 728-733, 26-29 May 1997.

As disclosed in the European patent application published under the EP 1 639 684 number, the energy storage device can be composed of super-capacitors arranged in series for a greater rapidity in charging electrical energy. This charging is ensured by a charger supplied either with direct current, when the power supply is independent of the supply system, or when the alternating current of the supply system has been beforehand converted into direct current, or with alternating current, in which case the charger must comprise its own AC/DC converter.

More precisely, in the European patent application published under the EP 1 661 226 number, a super-capacitor-based storage module charger is described. This charger is supplied with an energy source such as a fuel cell, a battery, or another energy source, which can in particular be a source of alternating current combined with an AC/DC converter.

In all the cases, an uninterruptible power supply device such as the aforementioned ones has a certain bulkiness. Furthermore, if a strong current must be provided in a discharging situation, it is sometimes necessary to make provision for the arrangement of several of these uninterruptible power supply devices in parallel.

It may therefore be desirable to provide a direct current backup power supply device that can overcome at least one part of the aforementioned problems and constraints.

SUMMARY OF THE INVENTION

The purpose of the invention is therefore a direct current backup power supply device of a data processing system to at least one computer supplied with very low voltage, whose direct current power supply is intended to be connected to an alternating current supply system by means of an AC/DC converter of alternating current into direct current comprising electrical energy storage means, characterized in that it furthermore comprises:
  means for charging electrical energy storage means from a part of the direct current provided by the AC/DC converter to the very low voltage power supply of the data processing system, and
  means for discharging the energy stored in the electrical energy storage means to the very low voltage power supply of the data processing system, at a noticeably constant predetermined very low voltage, following the detection of a micro-cut of the supply system.

Indeed, by being designed to directly charge itself using the current supplied by the AC/DC converter of the electrical system and directly discharge itself to the direct current supply of the electrical system, a backup power supply device in accordance with the invention has a reduced bulkiness by a better integration with the electrical system for data processing that it is intended to supply in case of micro-cut.

In an optional manner, the storage means comprises at least one super-capacitor with a double electrochemical layer.

Also in an optional manner, the storage means comprises at least one super-capacitor circuit arranged in series.

Also in an optional manner, each circuit of super-capacitors comprises means to compensate for a charge dispersion of super-capacitors arranged in series.

Also in an optional manner, the means to compensate for a charge dispersion comprises circuits for derivating a charging current of the super-capacitors arranged in series, each derivation circuit being set up between the terminals of one of the super-capacitors arranged in series and comprising means for regulating the current flowing through it according to a difference between a potential difference measured at the terminals of this super-capacitor and a reference potential difference.

Also in an optional manner, the regulation means comprises a MOS field-effect transistor whose grid voltage is a function of said difference between the potential difference measured at the terminals of this super-capacitor and the reference potential difference.

Also in an optional manner, the discharge means comprises a controller capable of detecting a voltage drop of the direct current supplied by the AC/DC converter and a switch controlled by this controller.

Also in an optional manner, the switch comprises several switches arranged in parallel controlled by the controller, each switch being in particular designed on the basis of a pair of N-MOS field-effect transistors arranged head-to-tail.

Also in an optional manner, the controller comprises a control logic designed to control successive closings and openings of the switch during a discharge cycle of the storage means, according to a predetermined minimum discharge threshold voltage and a maximum discharge threshold voltage.

Finally, the purpose of the invention is also an electrical system intended to be connected to an alternating current supply system, comprising an AC/DC converter of alternating current into direct current, a data processing system with at least one computer supplied with very low voltage connected to this AC/DC converter via a first supply circuit, a second derivation circuit of a part of the direct current supplied by the AC/DC converter arranged parallel to the first circuit, and a backup power supply device such as defined previously arranged in this second derivation circuit.

BRIEF DESCRIPTION OF THE DRAWINGS

The invention will be better understood by means of the following description, given only as an example and made by referring to the attached drawings, wherein:

FIG. 5 illustrates, by a temporal diagram, an operating example of the discharge controller whose operating logic is detailed in FIG. 4, FIGS. 6 and 7 illustrate, by temporal diagrams, an operating example of the system of FIG. 1 during a micro-cut of its alternating current supply system.

DETAILED DESCRIPTION

Figure 1:
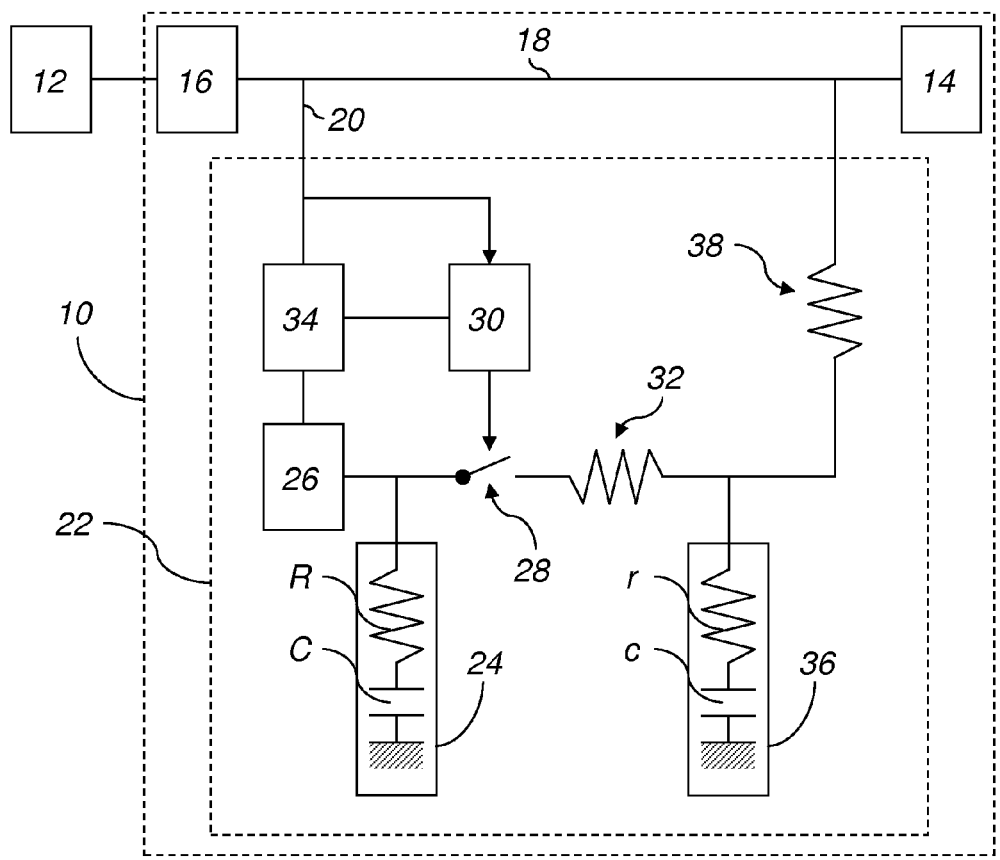
FIG. 1 diagrammatically represents the general structure of an electrical system according to an embodiment of the invention, FIG. 2 diagrammatically represents a possible distribution, on a board forming the support, of various elements of a backup power supply device according to the invention, FIG. 3 diagrammatically represents the general structure of energy storage means of the backup power supply device of FIG. 2, FIG. 4 diagrammatically represents the operating logic of a discharge controller of the backup power supply device of FIG. 2.

The electrical installation 10 represented on FIG. 1 is connected to an alternating current supply system 12 such as, for example, a system delivering a current at 50 Hz at a voltage of 230 V.

The electrical system 10 comprises an electrical system 14 for data processing intended to be supplied with direct current, at an intensity required by the electrical system 14 and at a predetermined noticeably constant voltage. For illustrative purposes only, the electrical system 14 is a set of computer servers forming a HPC computer. It is for example designed to be supplied with 700 A direct current under a noticeably constant voltage of 12 V.

"Noticeably constant" is understood to mean a direct voltage whose variations are low enough around its reference value (in this case 12 V in the application under consideration) so that the electrical system 14 can support them without damage to its data processing components. Since the data processing systems, for example of the computer type, are fitted with an internal conversion stage which regulates the current that they consume according to the input voltage to provide a very regular voltage which can drop to 1 V, 10 to 15% variations around the reference value of the direct voltage said to be noticeably constant supplied as input to these systems are acceptable. So, for example, it is acceptable to consider that a noticeably constant direct voltage of 12 V can vary between 11 and 13 V. Such a noticeably constant voltage is for example obtained by a regulation of the direct voltage supplied to the electrical system 14 using a reference maximum threshold voltage and a minimum threshold voltage.

To ensure this power supply, the electrical installation 10 therefore comprises an AC/DC converter 16 converting the 50 Hz alternating current under a voltage of 230 V into a direct current delivered under a voltage of 12 V. The electrical system 14, more particularly its direct current power supply, is connected to the AC/DC converter 16 using a first supply circuit 18.

A second derivation circuit 20 of a part of the direct current provided by the AC/DC converter 16 is arranged parallel to the first circuit 18 between the AC/DC converter 16 and the electrical system 14. This second circuit 20 comprises a device 22 for direct current backup power supply. Therefore, it enables the backup power supply device 22 to draw a part of the direct current delivered for the electrical system 14 by the AC/DC converter 16 in order to store electrical energy and to provide, in the case of micro-cut of the supply system 12, direct current drawn from the stored electrical energy to the electrical system 14. In other words, the backup power supply device 22 is designed to take over from the supply system 12 in case of micro-cut.

The backup power supply device 22 comprises means 24 for storing electrical energy. This storage means 24 can comprise one or more conventional batteries. Storage batteries generally have a good stored energy per unit volume ratio. However, they have a poor emitted peak power per unit volume ratio, which makes them of little benefit for applications where the electrical system 14 consumes a high intensity direct current. This is the case in particular when the electrical system 14 is a HPC computer since a 700 A direct current can be necessary. In this case, the means 24 for storing electrical energy advantageously comprises at least one super-capacitor, preferably at least one circuit of super-capacitors arranged in series, whose emitted peak power per unit volume ratio is clearly greater. However, this peak power cannot be emitted for too long a time, but this is more than enough to compensate for the micro-cuts of an alternating current supply system of good quality, the latter generally not exceeding a few hundred milliseconds or so.

The means 24 for storing electrical energy with super-capacitors will be detailed with reference to FIG. 3. The super-capacitors are generally of the EDLC (Electrochemical Double Layer Capacitor) type, i.e. designed according to the double electrochemical layer process. They have an internal resistance distinctly lower than that of the batteries. The means 24 for storing electrical energy with super-capacitors can be modeled by a circuit of the parallel RC type (i.e. circuit comprising a resistor and a capacitor in parallel), connected to the ground, on the one hand, and to the second circuit 20 of resistance R and of capacity C, on the other hand.

The backup power supply device 22 furthermore comprises means 26 for charging the means 24 for storing electrical energy from a part of the direct current provided by the AC/DC converter 16 to the power supply of the electrical system 14. This charging means 26 is constituted by a conventional super-capacitor charger and will therefore not be detailed. They make it possible to charge the means 24 for storing electrical energy within a few minutes, in general not more than three minutes, thus hardly disturbing the operation of the electrical system 14.

The backup power supply device 22 also comprises means 28, 30 for discharging the stored energy in the means 24 for storing electrical energy to the power supply of the electrical system 14, at a given intensity (required by the electrical system 14) and noticeably constant predetermined voltage, following the detection of a micro-cut of the supply system 12.

These discharge means comprise a switch 28 controlled by a controller 30. The switch 28 comprises for example at least one pair of N-MOS field-effect transistors arranged head-to-tail in series. This arrangement by pair makes it possible to isolate the super-capacitors from the means 24 for storing electrical energy of the electrical system 14, whatever the voltage at the terminals of the super-capacitors and of the electrical system 14. Moreover if, at the time of discharge, the current intended to flow through the switch 28 is greater than what such a pair of transistors can support, several pairs of transistors arranged in parallel, controlled by the same controller 30, can be provided to form the switch 28.

The switch 28 is illustrated on FIG. 1 by an ideal switch with which an internal resistor 32 is associated. The operation of the controller 30 will be detailed with reference to FIGS. 4 to 7. It is designed in particular to be capable of detecting a micro-cut of the supply system 12 as soon as the value of the voltage supplied to the electrical system becomes lower than a predetermined threshold voltage.

As indicated previously, the 700 A direct current provided by the AC/DC converter 16 to the power supply of the electrical system 14 has for example a 12 V voltage on the first circuit 18. Therefore, the current sampled by the second circuit 20 a priori has this same voltage of 12 V. However, in order that, in case of micro-cut, the means 24 for storing electrical energy can provide a direct current to the electrical system 14 at this same voltage of 12 Volts, it is necessary that they are charged at a higher voltage particularly because of the internal resistance of the means 24 for storing electrical energy and of that of the switch 28. For example, this necessary higher voltage can be close to 15 Volts. Furthermore, as the switch 28 consists of MOS field-effect transistors whose grid must be powered, the controller 30 must generally provide a voltage greater than 20 Volts.

For these reasons, a voltage step-up device 34 of the conventional type is provided upstream of the charger 26 and of the controller 30 in the second circuit 20, to step up the voltage from 12 V to 21 V by example. According to another variant, two different voltage step up devices could be envisaged, one for the charger 26, the other for the controller 30, since the voltages that they need are not the same.

The backup power supply device 22 operates in the following way:
when the electrical system 14 is supplied with direct current by the AC/DC converter 16, a part of this current is diverted by the second circuit 20 to charge the means 24 for storing electrical energy as long as they are not fully charged as yet,
when a micro-cut is detected by the controller 30, the latter controls the closing of switch 28 in order that the means 24 for storing electrical energy take over from the defective supply system 12.

The time spent by the switch 28 to close and let the current from the means 24 for storing electrical energy flow can however be enough to disturb the operation of the electrical system 14. Therefore, the backup power supply device 22 advantageously comprises additional means 36 for storing electrical energy, for example consisting of simple capacitors, called smoothing capacitors, arranged in parallel at the output of switch 28. The additional means 36 for storing electrical energy can, like the storage means 24 with super-capacitors, be modeled by a circuit of a parallel RC type, connected to the ground, on the one hand, and to the second circuit 20 at the output of switch 28, of resistance r and capacity c, on the other hand. As a non-limiting example, twenty or so smoothing capacitors can be arranged at the output of switch 28, for a resistance r of 0.5 mΩ and a capacity c of 0.01 F.

Owing to this additional means 36 for storing electrical energy, the backup power supply device 22 operates more precisely in the following way:
when the electrical system 14 is supplied with direct current by the AC/DC converter 16, a part of this current is diverted for a limited time by the second circuit 20 to charge the means 24 for storing electrical energy, as long as they are not fully charged as yet,
a small part of this current is also diverted for a limited time to charge the additional means 36 for storing electrical energy as long as they are not fully charged as yet,
when a micro-cut is detected by the controller 30, the latter controls the closing of the switch 28,
between the beginning of the micro-cut and the actual closing of the switch 28, a part of the electrical energy accumulated in the additional means 36 for energy storage is transmitted to the electrical system 14, and
when the switch 28 is actually closed, the means 24 for storing electrical energy take over from the malfunctioning supply system 12.

It will be understood that it is not useful to provide super-capacitors in the additional means 36 for storing electrical energy, since they are only intended to provide their stored energy for a very short transition time in the order of a few microseconds, clearly less than the time of the micro-cut.

Concretely, the backup power supply device 22, with its charger 26, its controller 30, its voltage step up device 34, its switch 28, and its storage means 24 and 36, is mounted on a board forming a support and having an internal resistance 38 equal for instance to 0.1 mΩ. This board, referenced 40, comprises the aforementioned elements according to a schematic distribution illustrated on FIG. 2.

Whereas the electrical system 14 is supplied by the AC/DC converter 16 with 12 V direct current from a 230 V alternating current via the first circuit 18, the second circuit 20 is also connected to the first circuit 18 so that it allows a charge of the backup power supply device 22 using this 12 V direct current. This charge is obtained by a direct current consumption generally between 0.5 and 18 A. The second circuit 20 also enables the controller 30 to sample the value of the direct current voltage provided by the AC/DC converter 16 in order to be capable of detecting a possible failure, with the occurrence of a micro-cut of the supply system 12.

The voltage step-up device 34, for example a DC/DC chopping converter, steps up the voltage of the direct current provided by the second circuit 20 to a 21 V direct current of intensity between 0 and 9 A depending on whether or not the backup power supply device 22 is in a charging situation. This current powers the controller 30 and the charger 26.

The charger 26 provides in turn, to the means 24 for storing electrical energy, a direct current whose intensity varies between 0 and 12 A depending on whether or not the device 22 for backup power supply is in a charging situation.

The means 24 for storing electrical energy should be sized so that, in a discharge situation, they can provide a 700 A current during for example at most 480 ms at a voltage of about 12 V always at least greater than a predetermined limit, for example set to 11 V.

In a concrete manner, the means 24 for storing electrical energy comprises at least one circuit of six super-capacitors arranged in series. For acceptable dimensions, it is possible to find super-capacitors with the following characteristics: a capacity equal to 600 F, an internal resistance equal to 0.83 mΩ and a maximum potential difference borne at the terminals of the super-capacitor of 2.7 V. So, a circuit of six super-capacitors arranged in series has an equivalent capacity C=100 F and an equivalent internal resistance R=4.98 mΩ. We demonstrate that the changes in the voltage of the current delivered by such a circuit during the discharge of its super-capacitors verifies the following equation:

$$V=(V_0-IT/C)-RI, \quad (1)$$

where $V_0$ is the charging voltage that the charger 26 must deliver, I=700 A the current delivered by the circuit, T=480 ms the maximum discharge time.

We see that, under these conditions, in order that the voltage V of the current delivered by the circuit is always greater than 11 V, the charging voltage $V_0$ must be at least equal to 17.85 V. And yet, the maximum potential difference borne at the terminals of the six aforementioned capacitors is 6×2.7 V=16.2 V. Therefore, it appears that a single circuit of six capacitors does not suffice.

By providing two circuits of six capacitors such as the aforementioned ones, arranged in parallel, means 24 for storing electrical energy whose equivalent capacity C is equal to 200 F and the equivalent internal resistance R is equal to 2.49 mΩ is designed. Under these new conditions, in order that the voltage V of the current delivered by the means 24 for storing electrical energy is always greater than 11 V, the charging voltage $V_0$ must at least be equal to 14.42 V. In practice, the voltage drop at the terminals of the switch 28 requires a slightly higher charging voltage, for example equal to $V_0$=14.8 V. Furthermore, by taking account of the internal resistance of the means 24 for storing electrical energy, it is thus possible for the second circuit 20 to deliver a 700 A current under a noticeably constant voltage, i.e. always between 11 and 13 V, in a discharging situation of the backup power supply device 22, for a maximum micro-cut time, including the restarting of the AC/DC converter 16, of 480 ms. It will also be noted that means 24 for storing electrical energy having these equivalent resistance and capacity parameters using super-capacitors can be charged in less than three minutes by the charger 26.

Figure 2:
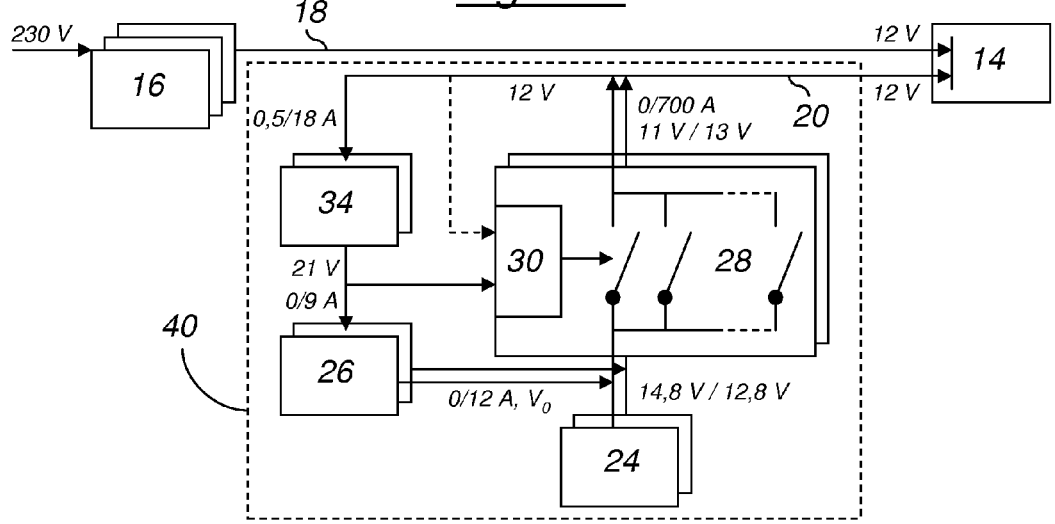

FIG. 2 illustrates the duplication of the circuit of six super-capacitors in the means 24 for storing electrical energy. It is also possible, for practical reasons, to duplicate the voltage step-up device 34, the charger 26, the controller 30 and the switch 28.

Lastly, as indicated previously and also as illustrated in FIG. 2, the switch 28 can be formed of several pairs of MOS transistors arranged in parallel, so that each of these pairs of MOS transistors only bears a fraction of the current intensity I=700 A provided in a discharge situation of the means 24 for storing electrical energy. For example, the switch 28 comprises six pairs of transistors.

Figure 3:
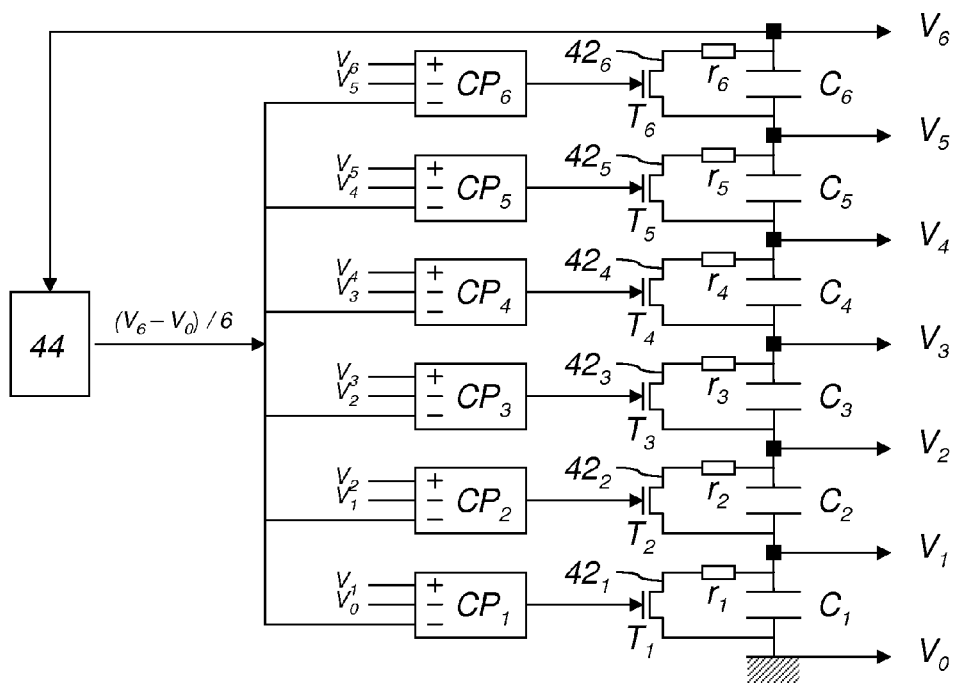

Any one of the super-capacitor circuits of the means 24 for storing electrical energy has for example a structure complying with the one illustrated in FIG. 3.

According to this structure, six super-capacitors $C_1$, $C_2$, $C_3$, $C_4$, $C_4$, $C_5$ and $C_6$ are arranged in series between the earth and the second circuit 20 at the output of the charger 26. During a charge of this circuit of six super-capacitors, the voltage ($V_6-V_0$) at its terminals increases up to the maximum value of 14.8 V. Ideally, if the six super-capacitors are strictly identical, the charge is distributed homogeneously in each of them, thus not locally exceeding the 2.7 V borne by each super-capacitor. Unfortunately, in reality a dispersion of the super-capacitor parameters is unavoidable by manufacture so that variations in the order of 20% can be reached from a super-capacitor to another one, particularly on their capacity. So, if nothing is provided to compensate for this dispersion, the six super-capacitors do not charge at the same rate and the respective potential differences at their terminals ($V_6-V_5$), ($V_5-V_4$), ($V_4-V_3$), ($V_3-V_2$), ($V_2-V_1$), ($V_1-V_0$) increase at different rates during a charge cycle: in this way, some can exceed the maximum value of 2.7 V that can be supported by the corresponding super-capacitors whereas the charge is theoretically not fully completed.

Therefore, it is advantageous to provide means to compensate for a charge dispersion of the super-capacitors. This compensation means provides for the presence of a charging current derivation circuit of the circuit of six super-capacitors at the terminals of each super-capacitor. Each derivation circuit comprises means for regulating the current flowing through it according to a difference between a potential difference measured at the terminals of the corresponding super-capacitor and a reference potential difference.

So, a first derivation circuit $42_1$ is provided at the terminals of the first super-capacitor $C_1$. It is characterized by a resistance $r_1$ and comprises a MOS field-effect transistor $T_1$ whose grid voltage makes it possible to adjust the portion of the charging current that is derivated in the derivation circuit $42_1$ to speed up or slow down the charging of the super-capacitor $C_1$. Indeed, the higher the grid voltage of the transistor $T_1$ is, the easier the charging current flows in the first derivation circuit $42_1$ and the less the super-capacitor $C_1$ charges quickly. Hence, the grid voltage of the transistor $T_1$ is advantageously provided by a comparator $CP_1$ providing, all the time, the value of the difference between the actual potential difference ($V_1-V_0$) between the terminals of the first super-capacitor $C_1$ and the ideal potential difference ($V_6-V_0$)/6 which should be measured at the terminals of the first super-capacitor $C_1$ if all the super-capacitors charged at the same rate. This comparator $CP_1$ can be produced using an operational amplifier mounted as subtractor whose positive input is at voltage $V_1$ (sampled at the higher potential terminal of the first super-capacitor), and whose negative input is connected to voltages $V_0$ (sampled at the lower potential terminal of the first super-capacitor) and $(V_6-V_0)/6$. This subtractor assembly is conventional and therefore will not be detailed.

Likewise, deflection circuits $42_2$, $42_3$ $42_4$, $42_5$ and $42_6$ similar to circuit $42_1$, whose derivations are adjusted by comparators $CP_2$, $CP_3$ $CP_4$, $CP_5$ and $CP_6$ similar to comparator $CP_1$, are provided at the terminals of super-capacitors $C_2$, $C_3$ $C_4$, $C_5$ and $C_6$.

For all the comparators $CP_1$, $CP_2$, $CP_3$ $CP_4$, $CP_5$ and $CP_6$, the voltage $(V_6-V_0)/6$ is provided by a voltage divider 44 sampling the voltage at the terminals of the circuit of six super-capacitors and dividing it by six.

Therefore, the previously described compensation means makes it possible to ensure a homogeneous charging of the six capacitors of each circuit of the means 24 for storing electrical energy up to the voltage of 14.8 V.

Figure 4:
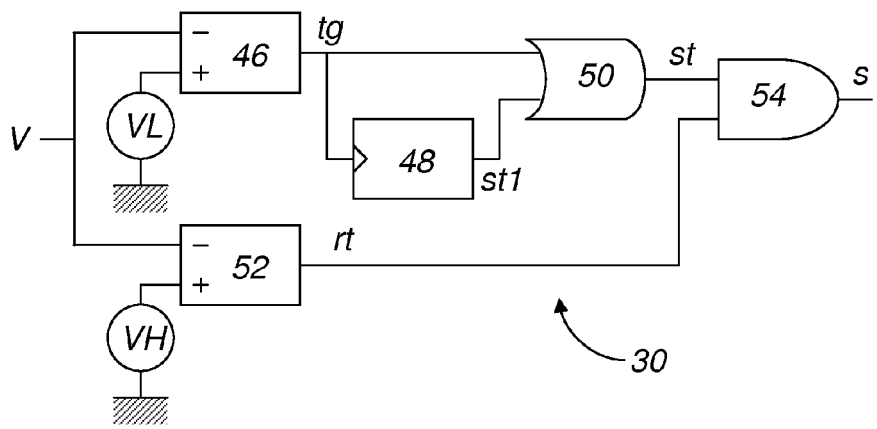

The operating logic of the controller 30 will now be detailed with reference to FIGS. 4 and 5.

The first function of this controller 30 is to detect any voltage drop in the first circuit 18 due to a micro-cut and the second function is to regulate the quantity of energy provided by the means 24 for storing electrical energy in a discharge situation of the device 22 for backup power supply in the electrical system 14.

It thus comprises a first comparator 46 which compares the sampled voltage V of the direct current supplied to the electrical system 14 with a reference minimum voltage VL between 11 and 12 V. The signal tg supplied at the output of this comparator 46, for example at "1" if the voltage V goes below the reference minimum voltage VL and at "0" otherwise, is supplied at the input of a timer 48. This timer 48 supplied a signal st1 maintained at "1" for a predetermined time, for example 25 ms. The signals tg and st1 are then transmitted to a "OR" logical module 50 supplying the signal st=tg OR st1 at the output. This logical arrangement enables the controller 30 to activate, using the switch 28, a discharge of the means 24 for storing electrical energy of the backup power supply device 22 as soon as the voltage V falls below the reference minimum voltage VL and to maintain this discharge for a minimum time predetermined by the timer 48, in order to avoid untimely switches of the switch 28.

Furthermore, the controller 30 must be designed so that the voltage supplied by the backup power supply device 22 does not exceed a maximum voltage that can be supported by the electrical system 14 of, for example, 13 V.

It then comprises a second comparator 52, which compares the direct voltage V supplied to the electrical system 14 with a reference maximum voltage VH between 12 and 13 V, and supplies at the output a signal rt which momentarily inhibits the discharge of the means 24 for storing electrical energy when this reference maximum voltage VH is exceeded by V. The signal rt supplied at the output of this comparator 52 is for example at "1" if the voltage V remains below the reference maximum voltage VH and at "0" otherwise. To avoid, also in this situation, untimely switches of the switch 28 around the voltage VH, the second comparator 52 is preferably a hysteresis comparator of the "Schmitt trigger" type whose hysteresis voltage is for example set to a low value VT in front of VH. In an embodiment variant, the first comparator 46 could also be a hysteresis comparator of the "Schmitt trigger" type.

The discharge of the means 24 for storing electrical energy by the signal rt is inhibited using an "AND" logical module 54 supplied by the signals st and rt and supplying the signal s=st AND rt at the output. This signal s makes it possible to control the opening (s at "0") or closing (s at "1", discharge situation of the backup power supply device 22) of the switch 28. More concretely, the signal s controls the pairs of transistors forming the switch 28.

For example, as this is visible on FIG. 5, when at a first time $t_0$, whereas signal s is null and the switch 28 open, the voltage V goes below the value VL, the signal tg and the signal st1 change to value "1". As the signal rt initially is at value "1", the signal s then changes to value "1" controlling the closing of switch 28. In this manner, the voltage V can increase by discharging the means 24 for storing electrical energy.

Even if the signal tg goes back to the value "0" at the end of a few milliseconds, the signal st1 remains at the value "1" up to a time $t_3$ such that $(t_3-t_0)=25$ ms, the predetermined duration of the timer 48. In the particular example illustrated in this figure, the signal st supplied at the output of the OR logical module 50 is identical to the signal st1.

Then, when at a time $t_1$ the voltage V, which still increases by discharging the means 24 for storing electrical energy, goes above the value VH+VT/2, the signal rt initially at the value "1" changes to the value "0". The signal s then changes to the value "0" controlling the opening of switch 28. The voltage V then starts decreasing again until it reaches the value VH−VT/2 at a time $t_2$. The signals rt and s then return to the value "1" again controlling the closing of the switch 28.

At a larger time scale, FIG. 6 shows that this control logic of the controller 30 makes it possible to maintain, by successive closings and openings of the switch 28 throughout the discharge of the backup power supply device 22, a noticeably constant voltage supplied to the electrical system 14, i.e. between 11 and 13 V, and not exceeding in particular the maximum value of 13 V, using the reference voltages VL and VH.

At a still larger time scale, FIG. 7 shows that the voltage provided by the backup power supply device 22 tends to diminish as expected by the equation (1). The successive closing and opening actions of the switch 28 then tend to become less frequent until a time $t_4$ when the switch 28 remains closed as long as the micro-cut persists. Lastly, at a time $t_5$, when the micro-cut is finished, and the supply system 12 can supply the AC/DC converter 16 again with alternating current, the controller 30 controls the opening of the switch 28 and the means 24 for storing electrical energy can again recover a maximum charging voltage equal to 14.8 V.

It will be noted that, in the detailed and illustrated embodiment above, the total duration of the micro-cut, which generally does not exceed 480 ms, in fact comprises the duration of the micro-cut as such added to the duration for restarting the power supply of the electrical system 14 with direct current by the AC/DC converter 16.

With the technological choices and the parameters given previously for illustrative purposes only, it will be noted that it is thus possible to design a very compact backup power supply device fitted into a box about 48 cm long×22 cm wide (surface mainly due to the dimensions of the board 40)×4 cm high (mainly due to the size of the twelve super-capacitors of the means 24 for storing electrical energy).

It clearly appears that a backup power supply device such as described according to the proposed embodiment is compact and capable of better integration into any electrical system which must be protected against micro-cuts than the known uninterruptible power supply devices. It can be advantageously substituted for them in geographical areas where the alternating current supply systems are of good quality (micro-cuts of some hundreds or so milliseconds) but can also be added in an installation already comprising a state of the art supply device due to its compactness and low production cost.

By using super-capacitors, it furthermore has a very high reactivity, both in terms of charge and discharge, and can even be combined with electrical systems requiring a high peak power. Another advantage of the super-capacitors in comparison with storage batteries is their clearly greater lifetime which can reach fifteen years.

The invention claimed is:

1. A direct current backup power supply device for a data processing system with at least one computer supplied with very low voltage whose direct current power supply is adapted for connection to an alternating current supply system using an AC/DC converter of alternating current into direct current, which includes means for storing electrical energy, wherein the direct current backup power supply device comprises:
    means for charging said means for storing electrical energy received from a part of the direct current supplied by the AC/DC converter to the very low voltage power supply of the data processing system; and
    means for discharging the electrical energy stored in the means for storing electrical energy to the very low voltage power supply of the data processing system at a noticeably constant predetermined very low voltage following the detection of a micro-cut of the alternating current supply system,
    wherein the means for discharging comprises a controller configured to detect a voltage drop of the direct current provided by the AC/DC converter and a switch controlled by the controller, and
    wherein the controller comprises control logic constructed to control successive closing and opening operation of the switch during one and a same discharge cycle of the means for storing electrical energy, according to a predetermined minimum discharge threshold voltage and a predetermined maximum discharge threshold voltage.

2. The backup power supply device according to claim 1, wherein the means for storing electrical energy comprises at least one electrochemical double layer super-capacitor.

3. The backup power supply device according to claim 2, wherein the means for storing electrical energy comprises at least one circuit of super-capacitors arranged in series.

4. The backup power supply device according to claim 3, wherein each said at least one circuit of super-capacitors comprises means for compensating a charge dispersion of the super-capacitors arranged in series.

5. The backup power supply device according to claim 4, wherein the charge dispersion compensation means comprise circuits for derivation circuit for deviating a charging current of the super-capacitors arranged in series, each derivation circuit being mounted between terminals of one of the super-capacitors arranged in series and comprising means for regulating the current flowing through the associated super-capacitor according to a difference between a potential difference measured at the terminals of said super-capacitor and a reference potential difference.

6. The backup power supply device according to claim 5, wherein the regulation means comprises a MOS field-effect transistor having a grid voltage that is a function of said difference between the potential difference measured at the terminals of said super-capacitor and the reference potential difference.

7. The backup power supply device according to claim 1, wherein the switch comprises several switches arranged in parallel controlled by the controller, each said switch having characteristics determined by a pair of N-MOS field-effect transistors arranged head-to-tail.

8. An electrical system adapted for connection to an alternating current supply system comprising:
    an AC/DC converter of alternating current into direct current;
    a data processing system including at least one computer supplied with very low voltage connected to said AC/DC converter via a supply;
    a derivation circuit configured to derivate part of the direct current provided by the AC/DC converter and arranged parallel to said supply circuit; and
    a backup power supply device according to claim 1 arranged in said derivation circuit.

9. The direct current backup power supply device according to claim 1, wherein the controller comprises:
    a first comparator and an associated timer configured to close the switch when a voltage of the direct current supplied to the data processing system falls below the predetermined minimum discharge threshold voltage, and to open the switch after a predetermined period if the voltage of the direct current supplied to the data processing system changes from a state lower than the predetermined minimum discharge threshold voltage to a state higher than the predetermined minimum discharge threshold voltage during said predetermined period; and
    a second comparator with predetermined hysteresis configured to close the switch when the voltage of the direct current supplied to the data processing system is lower than the predetermined minimum discharge threshold voltage, and to open the switch when the voltage of the direct current supplied to the data processing system is higher than the predetermined minimum discharge threshold voltage during said predetermined period.

10. The direct current backup power supply device according to claim 1, further comprising additional means for storing electrical energy at the output of the switch, said additional means for storing electrical energy being disposed between the switch and the data processing system.

* * * * *